Sept. 24, 1968  R. F. ROBERSON ET AL  3,402,784
TRACTOR GUIDANCE APPARATUS
Filed Aug. 19, 1966  3 Sheets-Sheet 1

INVENTORS
RAYMOND F. ROBERSON
DONALD P. STORM
ATT'Y

Sept. 24, 1968  R. F. ROBERSON ET AL  3,402,784
TRACTOR GUIDANCE APPARATUS
Filed Aug. 19, 1966  3 Sheets-Sheet 2
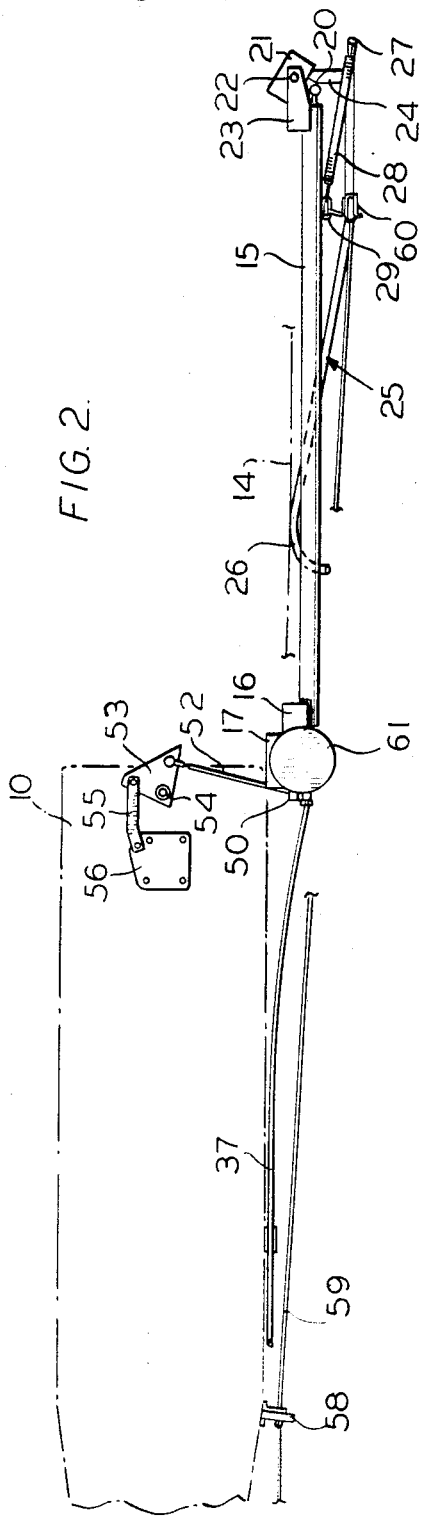
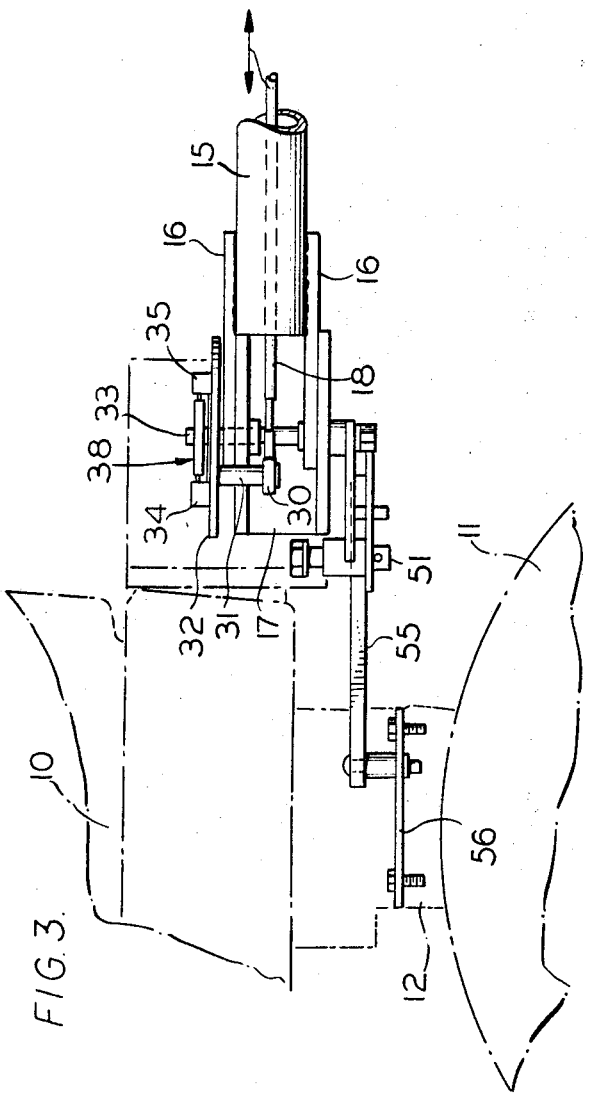
INVENTORS
RAYMOND F. ROBERSON
DONALD P. STORM
ATT'Y

INVENTORS
RAYMOND F. ROBERSON
DONALD P. STORM

ATT'Y

United States Patent Office 3,402,784
Patented Sept. 24, 1968

3,402,784
TRACTOR GUIDANCE APPARATUS
Raymond F. Roberson, Sacramento, Calif., and Donald P. Storm, Hinsdale, Ill., assignors to International Harvester Company, Chicago, Ill., a corporation of Delaware
Filed Aug. 19, 1966, Ser. No. 573,699
5 Claims. (Cl. 180—79)

ABSTRACT OF THE DISCLOSURE

A tractor having an implement such as a plow propelled thereby is automatically guided by a sensing device operatively engageable with an external guide line such as a furrow wall. The sensing device is deflectable from a normal neutral position when the tractor or implement strays, and such deflection, through suitable energy transmission means, actuates the tractor steering means to offset the deflection of the sensing device.

---

This invention relates to automatic guidance apparatus for vehicles, particularly farm tractors and implements.

In the operation of mobile implements for treating soil and crops the tractor operator must be constantly alert to steer the implement in the desired relation to a predetermined line, and an object of this invention is the provision of simple and efficient guidance means for a mobile implement wherein feeler means sensitive to a predetermined line and responsive to straying of the implement from a centered position or change in the direction of a furrow wall, automatically transmits a signal to the implement steering means to return the implement to its centered position.

Another object of the invention is the provision of novel automatic steering means for a tractor carrying a furrow forming implement, wherein sensing means is provided to engage the furrow and transmit appropriate signals to steer the tractor wheels.

Other objects and advantages of the invention will become clear from the following detailed description when read in conjunction with the accompanying drawings wherein:

FIGURE 2 is a plan view of the structure shown in FIGURE 1;

FIGURE 3 is an enlarged detail, with parts removed, of a portion of the structure shown in FIGURE 1;

Figure 5:
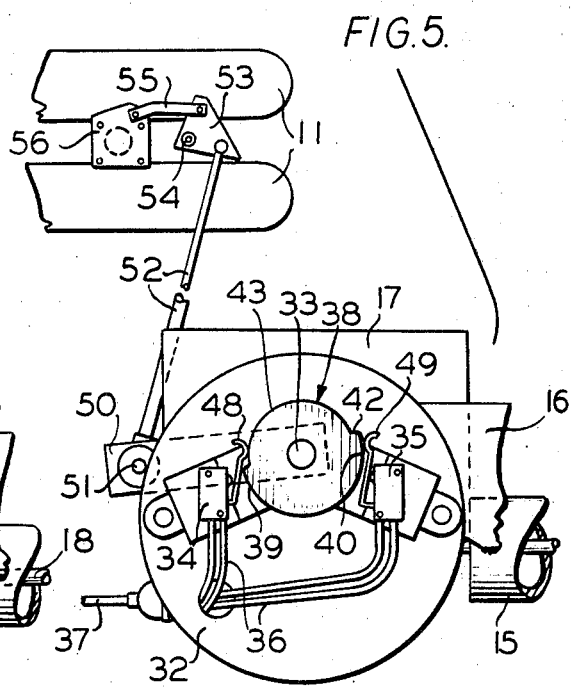
Figure 6:
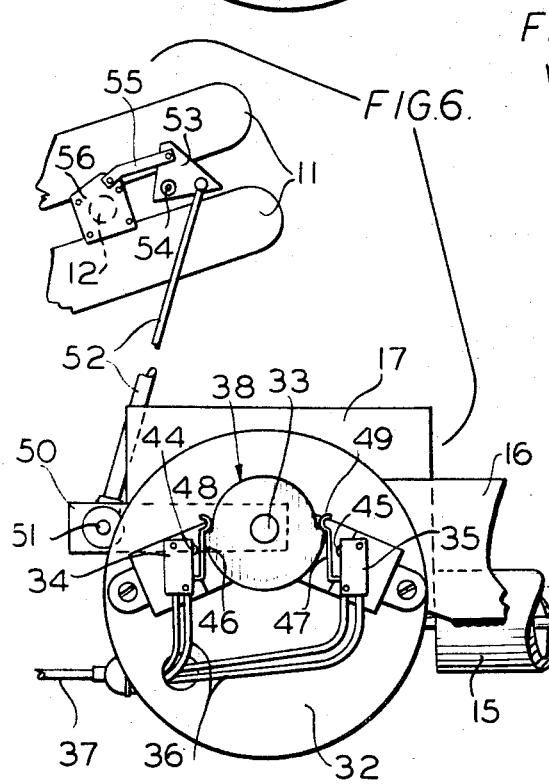

FIGURE 5 indicates the relative positions of the signal transmitting elements when a left turn signal has been given;

FIGURE 6 shows the signal transmitting parts again in neutral position, and

Figure 7:
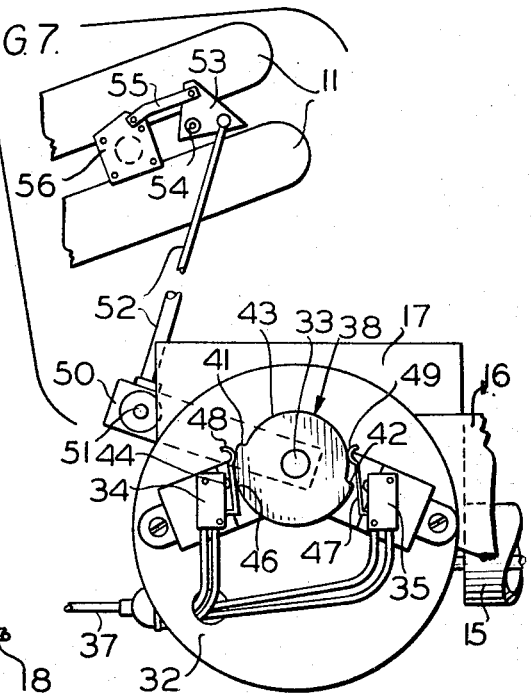

FIGURE 7 shows the relationship of the parts when a right turn signal has been given.

In the drawings the numeral 10 is a phantom designation of the forward portion of a tractor of a well-known tricycle-type having a pair of closely spaced steerable front wheels 11 supported by a rotatable vertical post 12 carried at the front end of the tractor and rotated to steer the front wheels by any suitable power operated steering means, not shown, controlled by the tractor operator from a steering mechanism 13. A variety of earth working tools may be mounted on and propelled by the tractor, and the guidance mechanism forming the subject of this invention is particularly designed for use with a plow or the like adapted to form a furrow having a wall such as is indicated at 14 in FIGURE 1.

The guidance mechanism of this invention includes a longitudinally extending tubular boom 15 affixed at its rear end between a pair of plates 16 which are secured to a U-shaped bracket 17 mounted on the forward portion of the tractor. A link 18 is slidably received in the interior of boom 15 and its forwardly projecting end is pivotally connected to a pin 19 mounted on the end of an arm 20 secured to a bar 21 affixed to an upright spindle member 22 mounted in plates 23 at the forward end of the boom, and having a lateral extension 24 upon which is pivotally mounted the forward upper end of a feeler or sensing rod 25 having a curved lower end 26 arranged to engage the furrow wall 14. The forward end 27 of feeler 25 is bent upwardly and serves as the anchor for one end of a spring 28, the other end of which is anchored to an eye 29 affixed to the side of boom 15. Spring 28 extends upwardly and inwardly from rod 25 and is disposed outwardly of the axis of spindle member 22, serving to bias the rod downwardly and inwardly.

Sensing rod 25 is capable not only of vertical movement about the axis of extension 24, but also lateral swinging about the axis of upright spindle 22. With the tractor wheels 11 centered, FIGURES 1 and 2 may be said to indicate the normal neutral operating position. The straying of the tractor wheels 11 from their centered position results in lateral movement of the rod 25 and therefore rotation of spindle 22 about its axis, resulting in longitudinal movement of link 18.

The rear end of link 18 is provided with an eye 30 pivotally mounted on the lower end of a pin 31, the upper end of which is conected to a horizontal switch plate 32 eccentrically mounted for rotation upon a vertical shaft 33 rotatably carried by the arms of U-shaped bracket 17. A pair of electrical switches 34 and 35 are secured to the upper surface of plate 32 and are connected by suitable wires 36 extending through a conduit 37 and receiving current from a source of electricity of any well-known form, not shown, carried by the tractor 10. It may also be understood that steering of the wheels 11 is effected by power operated steering mechanism of any well-known type operated by the electrical signal transmitting mechanism in response to movement of the sensing rod 25 and actuation of switches 34 and 35 to turn the tractor wheels 11 to the left or to the right.

The switches are actuated by a cam disk 38 affixed to the upper end of spindle or shaft 33. In FIGURE 2 it will be noted that the lower end of feeler 25 is held down and inwardly against the furrow wall by spring 28. If we assume that the furrow wall curves somewhat to the left, movement of rod 25 relative to the tractor occurs causing arm 20 to swing clockwise as in FIGURE 2 and transmit motion through link 18 to revolve switch plate 32, shown diagrammatically in FIGURE 5, wherein relative motion is indicated as having occurred between switch plate 32 and cam disk 38. Disk 38 is provided with oppositely disposed cam sections 39 and 40 forming shoulders 41 and 42, respectively, with the stction 43 of constant radius.

Figure 4:
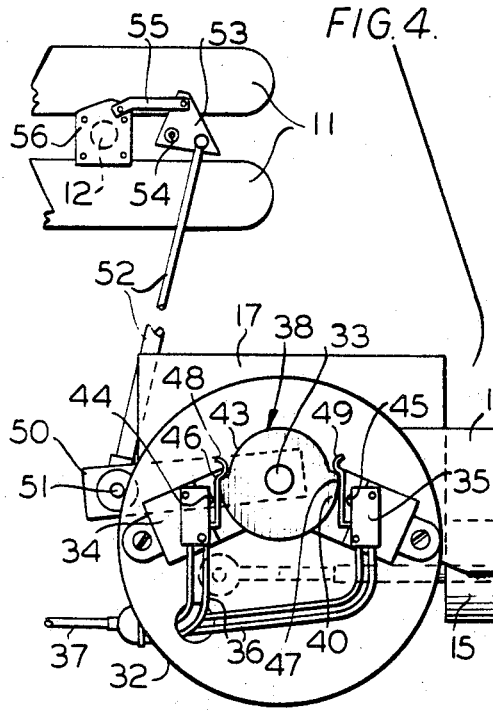
FIGURE 4 is a diagrammatic plan view on an enlarged scale of a portion of the signal transmitting means of this invention with the parts in a neutral position and with the tractor wheels centered.

Switches 34 and 35 are provided with contacts 44 and 45 and with spring closure fingers 46 and 47, respectively, anchored at one end to the switch housing and provided at their other ends with hook portions 48 and 49 adapted to seat in the opposing shoulders 41 and 42 in the neutral position of the parts as indicated, for example, in FIGURE 4. The closure fingers 46 and 47 are biased in the direction of cam disk 38, and when switch plate 32 revolves clockwise relative to disk 38, as indicated in FIGURE 5, cam portion 40 urges spring finger 47 outwardly into engagement with contact point 45 on switch 35 to transmit a left turn signal to tractor wheels 11.

The lower end of spindle 33 carrying cam disk 38 has affixed thereto a lever 50 the outer end of which is connected by a pin 51 with one end of a link 52, the other end of which is pivotally connected to a triangularly shaped bell crank 53 fulcrumed at 54 on the tractor body and also connected by a link 55 to a flange 56 carried by the steering post 12. Steering to the left, as indicated in FIGURE 6, thus transmits motion through bell crank 53 and link 52 to lever 50 to turn shaft 33 and cam disk 38 clockwise, causing switch actuating spring finger 47 to move away from contact 45 for switch 35 and for both of the hook shaped ends 48 and 49 of the spring fingers to again become seated in the shoulders 41 and 42 of the cam plate. This return of the signal transmitting parts to neutral position cancels the left turn signal to the tractor wheels 11.

The effect of a right turn signal is shown in FIGURE 7. In this case the furrow wall has veered toward the right causing the sensing bar 25 to swing outwardly relative to the tractor about the pivot 22, moving link 18 forwardly and revolving switch plate 32 in a counterclockwise direction. The hook portion 48 of left-hand actuating finger 46 then rides upon the cam surface 39, urging the actuating finger against contact 44 of switch 34 which transmits a signal to the power steering means of the tractor to execute a corrective right turn for tractor wheels 11. The turning of the wheels to the right then acts through link 18, link 52 and lever 50 to revolve cam disk 38 in a counterclockwise direction to a neutral position with hook numbers 48 and 49 seated on the shoulders 41 and 42 and with both switches open, cancelling the right turn signal.

Figure 1:
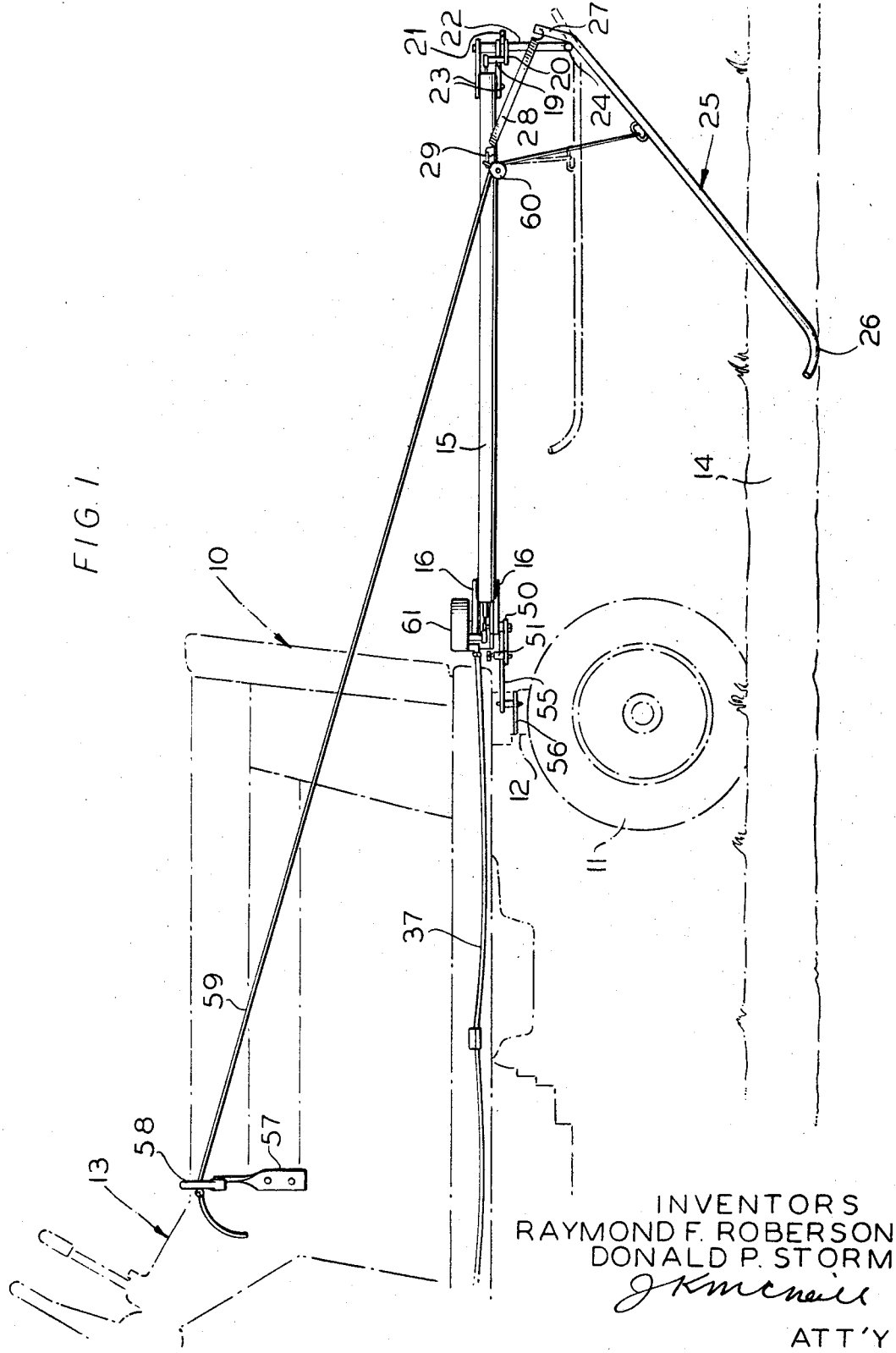
FIGURE 1 is a view in side elevation of guidance apparatus embodying the features of this invention mounted on the front end of a tractor.

A bracket 57 having an eye section 58 is mounted on the tractor body near the operator's station, and a cable 59 passing through the eye 58 is trained over a pulley 60 anchored to eye 29 at the forward of boom 15 and is connected to the feeler rod 25 medially of its ends to provide means for raising the sensing rod or feeler to a non-operating position such as is indicated in dotted lines in FIGURE 1. A dust cover 61 is preferably utilized to cover cam 38 and switch plate 32.

It is believed that the construction and operation of the tractor guidance apparatus of this invention will be clearly understood from the foregoing description. It should also likewise be understood that the invention has been described in its preferred embodiment and that modifications may be made therein without departing from the spirit of the invention or the scope of the appended claims.

What is claimed is:

1. Automatic guidance apparatus for a vehicle having a steerable wheel and power steering means therefor comprising, a generally vertical spindle mounted on the vehicle, a switch-carrying element and a switch-engaging element relatively rotatably mounted on said spindle, a sensing device carried by the vehicle in operative relation with an external guide line and deflectable from a normal position with respect to the vehicle, said sensing device being operatively connected to one of said elements for rotating it relative to the other of said elements in response to deflection of said sensing device to activate said switch-carrying element, said switch-carrying element being operatively connected to the power steering means of the vehicle to turn the steerable wheel of the vehicle in response to said activation of said switch-carrying element, and link means operatively connecting said steerable wheel to said other of said elements to rotate the latter relative to said one of said elements to deactivate said switch-carrying element in response to the turning of said steerable wheel.

2. The invention set forth in claim 1, wherein said guide line is a continuous wall of earth parallel to the direction of travel of the vehicle, and said sensing device is a rod connected to the vehicle for lateral movement relative thereto and engaging said wall of earth, spring means being connected between the rod and the vehicle to bias the rod against said wall of earth.

3. The invention set forth in claim 1, wherein said switch element is a plate having switches for right- and left-hand turning secured thereto rotatably mounted on the vehicle and said switch activating element is a camming device rotatably mounted on the vehicle in cooperative relation with said switch member, linkage being provided for connecting said sensing device to said plate for rotating the latter in response to deflection of said sensing device and additional linkage being provided for connecting said camming device to the vehicle steerable wheel.

4. The invention set forth in claim 3, wherein said sensing device is pivotally mounted for lateral swinging on a vertical axis at the forward end of a tubular boom secured at its rear end to the vehicle, and the linkage connecting the sensing device to said plate includes a link extending lengthwise through the interior of said boom and connected at its rear end to said plate.

5. Automatic guidance apparatus for a vehicle having a steerable wheel and power steering means therefor comprising, a sensing device mounted on the vehicle in operative relation to an external guide line, means mounting said sensing device on the vehicle for deflection from a normal position with respect to the vehicle, said mounting means including rotatable means on the vehicle connected to said sensing device and rotatable in response to said deflection thereof, switch means carried by said rotatable means operatively connected to the power steering means on the vehicle to turn said steerable wheel, switch activating means mounted on the vehicle and operatively engageable with said switch means upon rotation of said rotatable means to move said switch means to a switch closed position, and link means connecting said steerable wheel to said switch actuating means to move the latter relative to said switch means to a switch open position in response to said turning of said steerable wheel, said rotatable means comprising a plate having secured thereto right- and left-hand switches for controlling right- and left-hand turning of the steerable wheel, and said switch actuating means comprising a cam rotatable coaxially with said plate and having right- and left-hand actuating parts for actuating the respective of said switches upon rotation of said cam.

References Cited

UNITED STATES PATENTS

| | | | |
|---|---|---|---|
| 1,031,065 | 7/1912 | Hackney | 280—87.2 |
| 2,496,727 | 2/1950 | Jenkins | 180—79.1 |
| 2,509,914 | 5/1950 | Goodwine | 180—79.1 |
| 2,674,332 | 4/1954 | Ovshinsky | 180—79.1 |
| 2,791,167 | 5/1957 | Lockmiller | 180—79.1 X |
| 2,981,355 | 4/1961 | Rabuse | 180—79.1 |
| 3,038,544 | 6/1962 | Richey et al. | 180—79.1 X |

KENNETH H. BETTS, *Primary Examiner.*